United States Patent [19]

Kerner et al.

[11] Patent Number: 5,313,029

[45] Date of Patent: May 17, 1994

[54] SWITCH LEVER OF A STEERING COLUMN SWITCH FOR MOTOR VEHICLES

[75] Inventors: Wolfgang Kerner, Erlenbach; Franz Schreiber, Guglingen; Adam Weber, Bietigheim-Bissingen, all of Fed. Rep. of Germany

[73] Assignee: SWF Auto-Electric GmbH, Fed. Rep. of Germany

[21] Appl. No.: 910,310

[22] PCT Filed: Nov. 19, 1991

[86] PCT No.: PCT/EP91/02180

§ 371 Date: Aug. 28, 1992

§ 102(e) Date: Aug. 28, 1992

[87] PCT Pub. No.: WO92/09455

PCT Pub. Date: Jun. 11, 1992

[30] Foreign Application Priority Data

Nov. 22, 1990 [DE] Fed. Rep. of Germany ....... 4037153

[51] Int. Cl.$^5$ .............................................. H01H 9/00
[52] U.S. Cl. ................................................ 200/61.54
[58] Field of Search ....................... 200/61.27–61.38, 200/61.54, 293, 293.1, 51 R–51.17

[56] References Cited

U.S. PATENT DOCUMENTS

| | | | |
|---|---|---|---|
| 3,761,662 | 9/1973 | Charles | 200/16 B |
| 3,892,932 | 7/1975 | Erdelitsch et al. | 200/61.27 |
| 3,934,101 | 1/1976 | Jones | 200/5 B |
| 4,336,428 | 6/1982 | Berginski | 200/61.54 |
| 4,675,479 | 6/1987 | Wallin | 200/51.11 |
| 4,739,130 | 4/1988 | Roller et al. | 200/61.27 |
| 5,120,914 | 6/1992 | Kerner et al. | 200/61.54 |

FOREIGN PATENT DOCUMENTS

| | | |
|---|---|---|
| 2532093 | 1/1977 | Fed. Rep. of Germany . |
| 2853746 | 5/1980 | Fed. Rep. of Germany . |
| 3107440C2 | 10/1982 | Fed. Rep. of Germany . |
| 3740022 | 5/1989 | Fed. Rep. of Germany . |
| 2091943 | 8/1982 | United Kingdom . |

Primary Examiner—J. R. Scott
Attorney, Agent, or Firm—Dykema Gossett

[57] ABSTRACT

A switch lever of a steering column switch for motor vehicles has an electric switch arranged at the free end of the switch lever and includes at least one switch component and a housing, which is inserted as a functional switch unit with its housing in a holder in the free end of the switch lever. In the free end of the switch lever there are first electric connection contacts with which corresponding second electric connection contacts on the switch unit can be put into operational connection on the insertion of said switch unit. This provides a switch lever, the assembly of which to the switch unit is simplified and which at the same time ensures reliable operation.

18 Claims, 2 Drawing Sheets

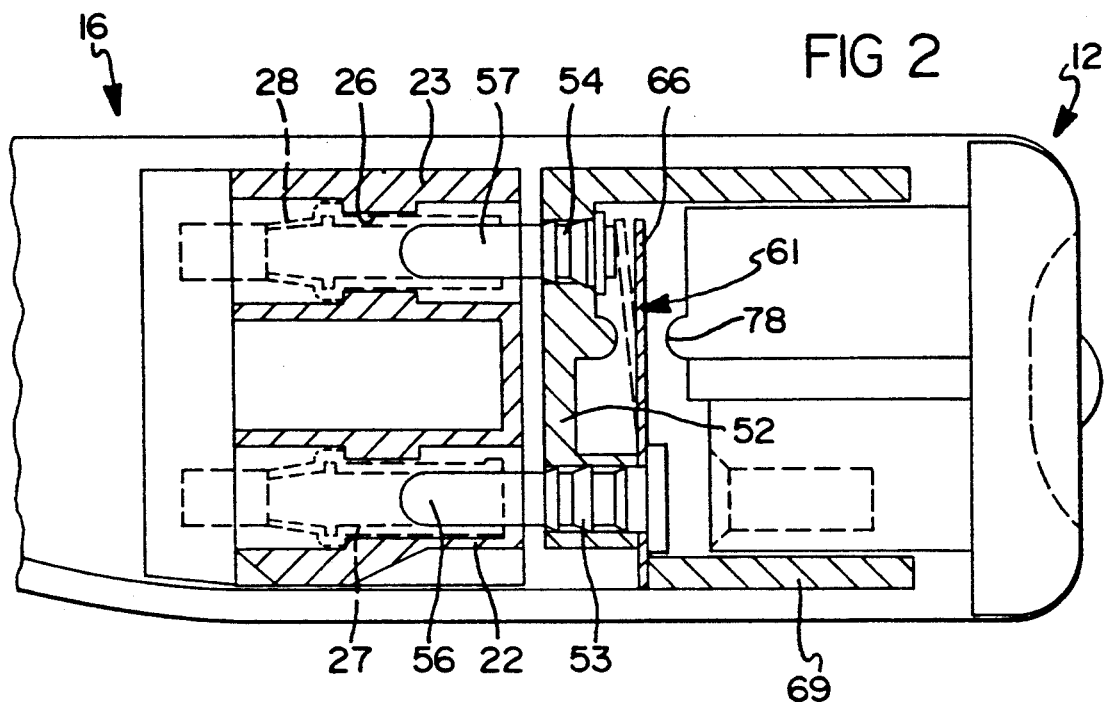
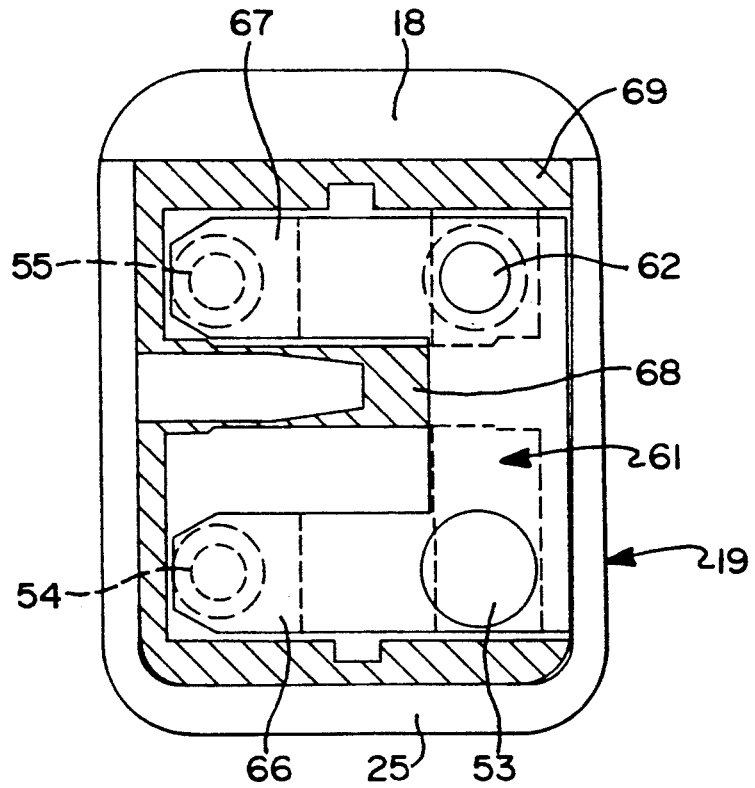

SWITCH LEVER OF A STEERING COLUMN SWITCH FOR MOTOR VEHICLES

TECHNICAL FIELD

The present invention relates to a switch lever and in particular a steering column switch lever for motor vehicles.

BACKGROUND

An example of a known switch lever is disclosed in German patent number DE 25 32 093 A1. The electric switch comprises a multipart housing, one part of which holds the end of the switch lever as a holding shell and is stationarily connected with it. Another part of the housing is axially movable as a slide towards the one housing part for implementing a switching function. Within the slide furnished with a cap, a first connection contact located opposite a second connection contact held on the holding shell is provided.

Another example of a switch lever is disclosed in German patent number DE 31 07 440 C2. The switch lever serves as a switch housing, in which the different switch components, as for example push-button, springs, bridging contact, printed circuit board etc. are included.

Both switch levers have the different switch components arranged around the end of the switch lever or are arranged separately or in groups in the end of the switch lever. The cables are connected to the respective connection contacts or to the printed circuit board by way of soldering after having pulled the cables through the hollow switch lever.

This way of assembling the switch components on or in the end of the switch lever requires a lot of effort and is rather awkward. Besides, the soldering procedure is difficult and may lead to failure and complaint.

The object of the present invention is to provide a switch lever of the kind mentioned above wherein the assembly of the switch to the switch lever is simplified and ensures reliability.

SUMMARY OF THE INVENTION

The present invention makes it possible to prefabricate an electric switch as a complete switch unit and to insert this switch unit into a switch lever in a simple manner. The switch lever has the electric connection contacts connected to the cables and is adapted to receive the electric switch as a unit. The advantage is that operational reliability of the switch unit can be checked before inserting the switch unit into the end of the switch lever. Furthermore it is possible to use such a switch unit for other purposes. Still further, the connection between the connection contacts at the end of the switch lever and the corresponding cables can be realized in a simple manner; thereby common contact elements and cable connections can be used resulting in less effort and increased operational reliability.

For instance, it is possible to provide the connection contacts in each of the lateral areas of holders in the end of the switch lever or in the housing of the switch unit. In a preferred embodiment of the present invention, however, the first connection contacts are provided in the longitudinal direction of the holder for the switch unit. Thus the switch lever can be of a narrow overall height.

The switch lever also includes a removable cover assembly that includes means to hold contacts which simplifies the assembly of the switch lever. Furthermore, the connection contacts and the ends of the cables can be connected by common easy to use connections so that no great effort for inserting them is needed.

Retaining webs are also provided for retaining the cables making insertion of the cables simpler and additionally providing better retention of the cables. Besides, the cables are held in the cover and cannot be squeezed during the assembly.

The present invention provides the further advantage of switch unit replacement in case of a defect. It is possible to have detachable latching by way of latching means on the housing of the switch unit at the inside of the end of the switch lever, however it is also possible to realize the latching by other measures, for example on the plug-in connection.

Further details of the invention can be gathered from the following description, in which the invention is described in detail by way of the embodiments illustrated in the drawings.

DESCRIPTION OF THE DRAWINGS

FIG. 2 is a partial cross-section taken along the line II—II of FIG. 1, and

FIG. 3 is a partial section taken along the line III—III of FIG. 1.

DETAILED DESCRIPTION OF THE INVENTION

Figure 1:
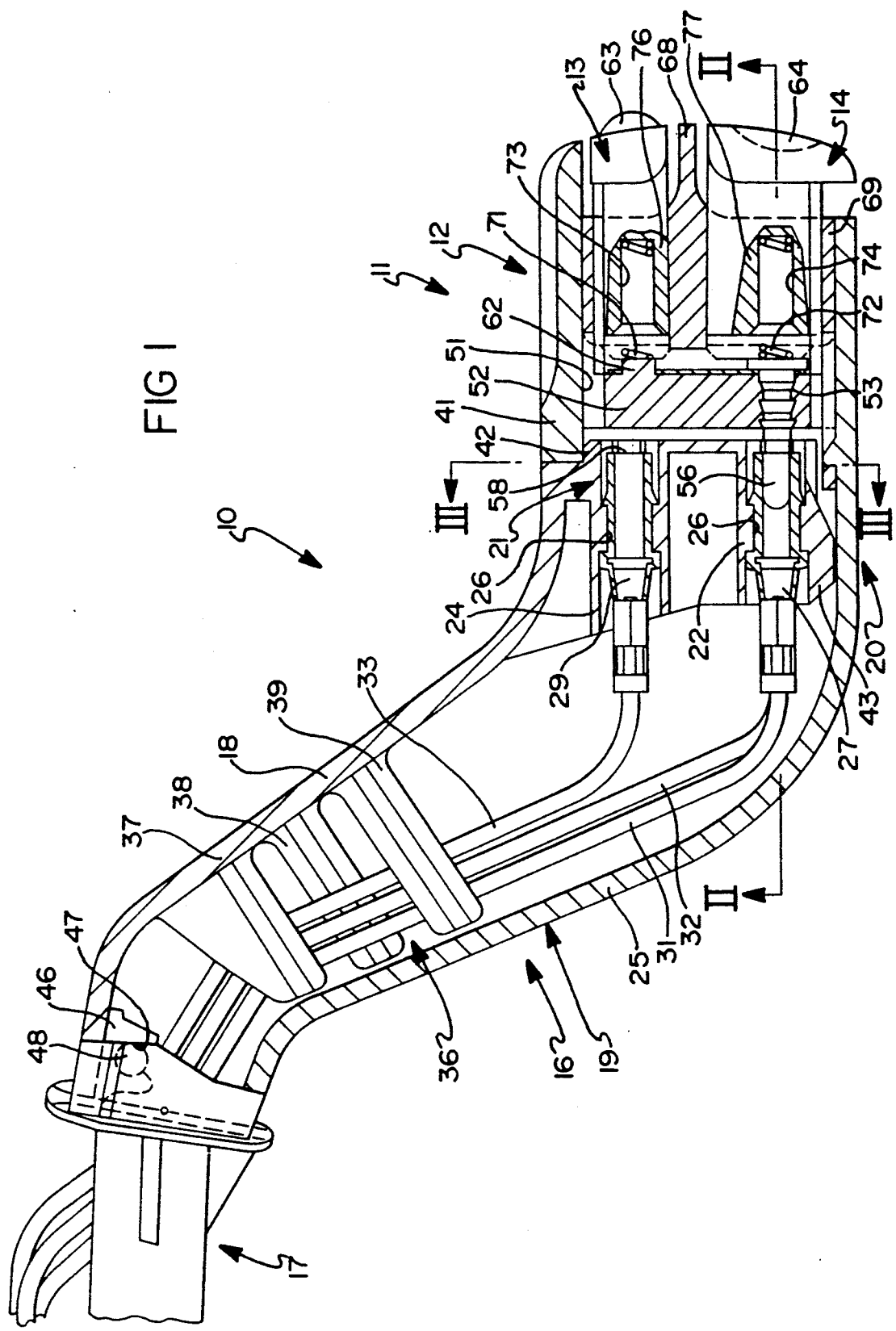
FIG. 1 is a longitudinal partial cross-section of a switch lever fitted at its end to a switch unit according to a preferred embodiment of the present invention.

The switch lever 10 illustrated in the drawing according to a preferred embodiment of the present invention is part of a steering column switch, the end of which (not illustrated) is for example swivellably and/or rotatably mounted on the steering column of a motor vehicle.

The switch lever 10, the cross-section of which is disclosed as approximately rectangular, is generally curved according to the illustration of FIG. 1 and runs—while its cross-section is continuously enlarged—towards its straight free end portion 11. The cross-section of said free end portion is constant. A switch unit 12 is held in this free end portion 11, which switch unit 12 includes two switch components 13 and 14 illustrated in the embodiment.

The switch lever 10 includes a housing 16, which in an area between a link 17 of the steering column switch and the free end portion 11 of the switch lever 10 has a housing member 19 of a U-shaped cross-section, which is provided with a detachable cover 18 at its lower side upon assembly, and a housing member 20 of a rectangular cross-section at its free end portion 11 which housing members 19 and 20 are preferably made of plastics and are preferably integrally formed. The housing cover 18, which is flat in perpendicular direction to the drawing plane of FIG. 1 and which covers the two lateral parallel legs of the U-shaped housing member 19 in the assembly position, include at its end facing the rectangular housing member 20, a wall section 21 extending generally perpendicular to cover 18 towards the interior of housing 19. In the area of three of its corners this wall section 21 is furnished with enlargements 22, 23, 24 extending inwardly from the end of the housing member 20 and provided with a stepped bore 26 each, in which a plug-socket 27, 28, 29 is axially fixed and latched. Each plug-socket 27, 28, 29 is fixedly connected, preferably fixedly crimped to the insulated end of a cable 31, 32, or 33 at its inner end.

The detachable cover 18 is provided—in an area next to the link 17—with a detentioning or retaining device 36 in the form of three parallel webs 37, 38, 39. The webs extend generally perpendicular to from the inside of the plastic cover 18 in the direction of cables 31, 32 and 33 and are adjacent to each other and spaced about the same distance from one another. The webs can also extend at an angle with respect to the cover. Thus for the purpose of retaining, the cables 31, 32, 33 can be put beside or above each other between the webs 37, 38, 39, as can be seen in FIG. 1. Both the free ends of the webs 37, 38 and 39 and the front of the wall section 21 extending from the cover 18 lie in the assembly position of the cover 18 adjacent the bottom 25 of the U-shaped housing member 19 or lie on it.

The cover 18 can be removed from the U-shaped housing member 19 of the switch lever 10. The end of cover 18 facing the end portion of the housing member 20 is provided with a shoulder 42 that engages the ceiling 41 of housing member 20 and a projection 43 which acts as a thrust bearing at the bottom of the U-shaped housing member 19. Furthermore the other end of the detachable cover 18 is provided with a cut groove 47 on a stud 46, by way of groove 47 this end of the cover 18 can latchingly engage transverse pin 48 which is held between the two parallel legs of the U-shaped housing member 19.

Thus in a simple manner the cables 31, 32 and 33 can be inserted from the one end into the housing 16 while it is still open (if the cover has been taken off) and can firmly be connected to the plug sockets 27, 28 and 29 held on the housing cover 18, and can be inserted between webs 37, 38 and 39. By closing the cover 18 the cable connection through the switch lever 10 to for example the respective relays in the motor vehicle is realized.

In the end of the housing member 20 of the switch lever housing 16, which housing member 20 is in the preferred embodiment of a rectangular cross-section, a rectangular holder 51 is provided into which the switch unit 12 can exchangeably be inserted. For this purpose the switch unit 12 is completely and operationally preassembled. The switch unit 12 comprises a base plate 52 which is provided with penetration bores 53, 54 or 55 at three of its four corner areas, in which penetration bores plug pins 56, 57 or 58 are held. The plug pins 56, 57 or 58 extend through base plate 52 and can be inserted into the corresponding plug sockets 27, 28, 29 in the wall section 21 of the housing cover 18. The two switch members 13 and 14 contained in the switch unit 12 comprise a joint U-shaped blank of a contact spring 61, which in one corner at the inside of the base plate 52 is fixed and electrically connected to the one plug pin 56 and in another corner at the inside is firmly linked to the base plate 52 via a calked rivet pin 62 for example. Each switch member 13, 14 has a push button 63, 64 which can engage a free movable end 66 or 67 of the contact spring 61. In a non-actuated rest position each end of the spring 66, 67 lies—according to FIG. 2—at a spaced distance from the end of the respective plug pin 57, 58. The push-buttons 63, 64 are axially movably held in a switch housing 69 provided with a partition 68 and cannot be lost. The axial movability is carried out against the pressure of a spring 71, 72 which is on the one hand supported in a bore of a pocket hole 73, 74 and on the other hand on the spring blank 61. Via a nose 78 arranged on a tappet 76, 77 of the push button 63, 64 the respective free end of the spring 66, 67 is made to lie on the respective plug pin 56 58 in operational position by the corresponding push-button.

The switch unit 12 can detachably be latched with its switch housing 69 in a way not illustrated in detail within the holder 51. The bottom of switch lever housing member 20 is formed by the wall section 21 of the cover 18 of the housing member 19. In this latching position according to FIG. 1 the plug pins 56–58 are inserted into the plug sockets 27, 28 and 29 so that the switch unit 12 and cables 31, 32 and 33 are electrically connected. Instead of latching the switch unit on the housing it is also possible to latch it connecting the plug pin to the plug socket.

What is claimed is:

1. A switch lever assembly adapted for use on a vehicle steering column, said switch lever assembly comprising: a switch lever having a free end;
   a first electric connection contact positioned in the switch lever; and
   a modular electric switch unit, said electric switch unit at least partly inserted into the free end of the switch lever, said electric switch unit including at least one integral switch component, and a second electric connection contact formed on the switch unit, wherein the first and second connection contacts are mated to form an operational connection on the insertion of said switch unit into the free end of the switch lever.

2. A switch lever according to claim 1 wherein the first connection contact is provided on a wall section at the free end of the switch lever, the wall section adapted to receive a holder, the electric switch unit inserted in the holder.

3. A switch lever according to claim 2, wherein the switch unit is detachably latched in the holder.

4. A switch lever according to claim 1, wherein the switch lever includes a detachable cover allowing access to the first and second connection contacts and including a wall section substantially occupying the cross-section of the switch lever, the first connection contact mounted in the wall section.

5. A switch lever according to claim 4 wherein an underside of the detachable cover is furnished with webs arranged one beside the other at a certain distance and, the webs retaining an electric wire positioned in the switch lever and firmly fastened to the first connection contact.

6. A switch lever according to claim 1 wherein the first and the second connection contacts are formed by one of plug sockets and plug pins.

7. A switch lever according to claim 1, wherein the switch unit includes at least two switch components.

8. A switch lever assembly as recited in claim 1, wherein said switch component comprises:
   a contact spring having a free movable end biased away from said first electric contact;
   a push button, said push button adapted to selectively engage said movable end of said contact spring to bring said contact spring into contact with said first electric contact to actuate said switch lever assembly.

9. A switch lever assembly as recited in claim 1, further comprising a holder to receive said switch unit, said switch unit being inserted in said holder.

10. A switch lever assembly adapted for use on the steering column of a vehicle, said switch lever assembly comprising:

an elongated housing having opposed ends, one of said ends having at least a first electric contact mounted therein;

a modular switch module being insertable into said one of said ends of said housing and retained therein, said switch module including actuation means and at least a second electric contact, with said first and second electric contacts operatively mated on the insertion of the switch module into said housing to form an electric connection for use with said actuation means.

11. The switch lever assembly of claim 10, wherein said elongated housing includes a removable cover.

12. The switch lever assembly of claim 11, wherein said removable cover includes a mounting means for mounting said second electrical contact, said mounting means extending outwardly from said removable cover and is received within said housing when said cover is attached.

13. The switch lever assembly of claim 10, wherein said elongated housing receives electric wires connected to said first electric contact as part of said electric connection, said housing including a removable cover to facilitate the routing and connection of said wires within said housing, said cover including retaining means adapted to properly retain said wires within said housing.

14. The switch lever assembly of claim 13, wherein said removable cover includes outwardly protruding webs that are spaced and receive said electric wires to properly retain said wires within said housing.

15. The switch lever assembly of claim 10, wherein one of said first and second electric contacts is a plug socket and the other of said first and second electric contacts is a pin received in said plug socket to form said electric connection.

16. A switch lever assembly comprising:

a housing having opposed ends and at least one first electric contact;

a modular switch module being received in one of said ends and having at least one second electric contact;

a removable cover removably attached to said housing to expose the interior of said housing when said cover is removed, said first electric contact integrally formed to an underside of said cover facing the interior of said housing when said cover is attached to said housing, whereby said first and second contacts may be easily operatively mated to form an electric connection as said cover is attached to said housing.

17. A switch lever assembly as recited in claim 16, wherein an underside of the detachable cover is furnished with webs arranged one beside the other at a certain distance and, said webs retaining electric wires positioned in said housing and firmly fastened to said first electric contacts as part of said electric connection.

18. A switch lever assembly as recited in claim 16, wherein said switch module includes an actuation means, said electric connection being used in conjunction with said actuation means.

* * * * *